Feb. 25, 1958   L. L. LYON ET AL   2,824,588
MELON SLICING DEVICE.
Filed Sept. 14, 1956
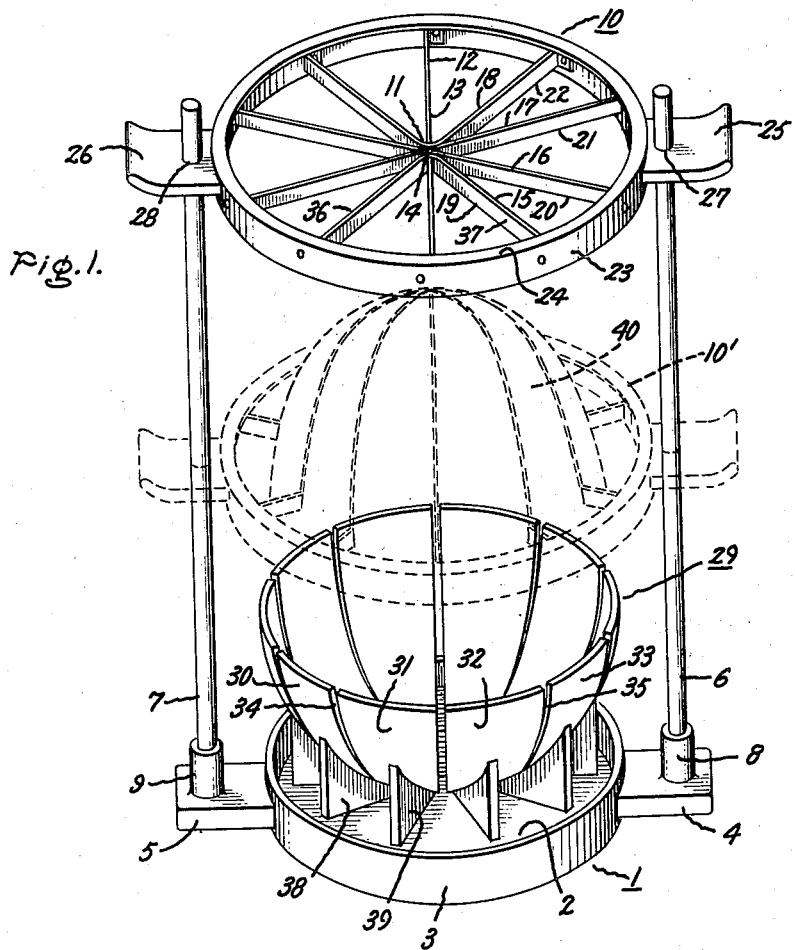
Inventors:
Leander L. Lyon,
Florence N. Lyon,
by George H. Baldwin
Their Attorney.

United States Patent Office 2,824,588
Patented Feb. 25, 1958

2,824,588

MELON SLICING DEVICE

Leander L. Lyon and Florence N. Lyon, Tampa, Fla.

Application September 14, 1956, Serial No. 609,914

1 Claim. (Cl. 146—160)

This invention pertains to a slicing device for cutting watermelons and similarly spherical and spheroidally shaped melons into segments.

A general object of this invention is to provide an improved melon slicing device. A further object of this invention is to provide a melon slicing device of simple and sturdy construction, inexpensive to manufacture, safe in operation and easily cleaned.

It heretofore has posed a problem quickly, easily and neatly to cut certain melons such as watermelons into spheroidal wedge shaped segments for serving or display purposes, the usual manual methods being time consuming, dangerous, messy and resulting in melon segments of varying sizes. By the use of this invention, which incorporates a guided multi-bladed knife assembly and holding bowl, cutting melons into such segments is a simple, safe procedure, quickly accomplished in a neat manner, and providing at one stroke melon segments of a uniform size.

Further objects of the invention accordingly are to provide a slicing device comprising a knife blade assembly capable of entering a melon with a minimum of force, for ease of operation, and so as to avoid rupture of the melon, wherein the knife blade assembly is easily interchangeable to provide varying numbers of melon segments, wherein a minimum of handling of the melon is necessary, and wherein the juice resulting from the slicing operation is caught in a receptacle.

The novel features which are believed to be characteristic of this invention are set forth with particularity in the appended claim. The invention itself, however, both as to its organization and method of operation, together with further objects and advantages thereof, may best be understood by reference to the following description taken in connection with the accompanying drawing, in which:

Fig. 1 is a perspective view of the invention showing the knife blade assembly at the top of the stroke, and further representing in broken lines the knife blade assembly during operation partially cutting a melon into segments;

Fig. 2 is a detail perspective view, partially in section, showing broken away portions of the knife blade assembly of this invention.

Referring now to the drawing, Fig. 1 shows in full lines the slicing device preparatory to commencing a downward slicing stroke. As seen, the slicing device comprises a circular base generally referred to as 1, the base comprising a base plate 2 forming in conjunction with a circular upstanding rim 3 a juice receptacle, and further comprises rigidly attached diametric outwardly projecting lips 4 and 5. Guide rods 6 and 7 are rigidly mounted on outwardly protruding lips 4 and 5 and project upwardly therefrom in spaced parallel relation. Stops 8 and 9 are securely attached to guide rods 6 and 7 respectively, and are also preferably attached to lips 4 and 5, whereby the stops function additionally as supporting sleeves or ferrules for the guide rods.

The knife-blade assembly generally referred to as 10 has a center at 11 and comprises a straight blade 12 having its cutting edge 13 downwardly disposed. Straight blade 12 passes through center 11 and has a notch 14 entering the upper edge of the blade at center 11. Four cross blades 15, 16, 17 and 18, having downwardly disposed cutting edges 19, 20, 21 and 22, respectively, are included in the blade assembly. These four blades are bent at their respective centers and fitted thereat into notch 14. The cutting edges 20 and 21 of blades 16 and 17 lie at a height slightly above the height of cutting edge 13 of straight blade 12 and cutting edges 19 and 22 of blades 15 and 18 are at a slightly greater height than edges 20 and 21.

The assembly 10 further comprises a horizontal circular frame 23 of which the upper edge is formed into a horizontal inwardly projecting rim 24. The several blades are detachably affixed to frame 23. Diametric outwardly projecting handles 25 and 26, which curve slightly upwardly near the outside ends thereof, are rigidly attached to frame 23. Each of handles 25 and 26 have openings 27 and 28 respectively receiving guide rods 6 and 7 respectively and are engaged slideably thereon.

The melon holder bowl 29 of hollow generally hemispheroidal, ellipsoidal or paraboloidal shape comprises a plurality of like curved approximately triangularly shaped sections such as 30, 31, 32 and 33, which are separated from each other by a plurality of like slots such as 34 and 35, which lie in respective vertical planes. This arrangement allows a respective blade to pass through each slot between each pair of the respective bowl sections during the downward stroke of the slicing operation. For example, portion 36 of cross blade 15 passes through slot 34 between members 30 and 31, while the opposite portion 37 of blade 15 passes through slot 35 between members 32 and 33. Each of the bowl sections is respectively and individually supported by means of a respective post. Specifically, post 38 is rigidly affixed to base 1 and to section 30, while post 39 is similarly affixed to support section 31.

Fig. 1 suggests in broken lines a melon 40 being divided by the knife blade assembly indicated in its displaced operating position by broken lines at 10' during the slicing operation depressed from its upper position in response to downward force applied to the upper portions of the handles of the assembly, the assembly being guided in its downward motion by guide rods 6 and 7 whereby the several blades travel in respectively vertical downward directions thereby insuring straight cuts and uniformly sized melon segments. Guide rods 6 and 7 prevent the knife blade assembly from rotating or tipping and maintain the relation of the several blades with their respective slots so that the blades pass through the slots without striking any of the sections.

As shown in Fig. 2, the knife blade assembly 10 has a center at 11 and comprises a straight blade 12 having a cutting edge 13 and a top edge 41. The straight blade passes through center 11 and has a notch 14 entering from top edge 41 at center 11. The cross blades 15, 16, 17 and 18, having cutting edges 19, 20, 21 and 22 respectively, are bent at their respective centers and fitted thereat into notch 14 and secured thereat to each other and to straight blade 12 by spot welds 42.

Fig. 2 shows in broken lines one-half of blades 15 and 16 broken away so that the details of one-half of notch 14 and of the junction of cross blades 15 and 16 with straight blade 12 and with each other are shown. The shape of notch 14 determines the position of cutting edges 17 and 18 and it will be seen said cutting edges lie at different respective heights with respect to the height of cutting edge 13, thereby allowing knife blade assembly 10 to commence its slice into the melon with the facility of a single cutting edge. This arrangement also prevents undue pressure from being exerted on the top of the melon by the knife blade assembly, thereby avoiding rupture of the melon. It will be clearly seen that edges 20 and 21 are disposed slightly higher than edge 13 and that edges 19 and 22 are disposed slightly higher than edges 20 and 21.

In operation, knife blade assembly 10 is positioned on guide rods 6 and 7 high enough thereon to permit a melon to be placed in melon holder 29 which supports the melon in approximately the proper position for the slicing operation. As the assembly is manually moved downwardly by the use of handles 25 and 26, straight blade 12 engages the melon and the operator at this time may manually straighten the melon so that center 11 is aligned with the upper center of the melon. The downward stroke is resumed by exerting downward pressure on handles 25 and 26 whereby straight blade 12 makes an initial slice into the melon succeeded first by cross blades 16 and 17 and then by blades 15 and 18 respectively. Normally after knife blade assembly 10 has sliced through a substantial portion of the melon, as suggested by its position at 10' shown in broken lines in Fig. 1, the several blades enter their respective bowl slots, and upon the completion of the downward stroke, knife blade assembly 10 has passed completely through the melon, which then partially unfolds from the center thereof outwardly until each melon segment comes into contact with and is supported by its corresponding section 30, 31 and the like of melon holder 29. Coincident therewith, the bottom surfaces of handles 25 and 26 come into contact with the upper portion of stops 8 and 9 respectively, thereby preventing the cutting edges of the several blades from striking base 1. The juice escaping from the melon flows downwardly through the several slots into the juice receptacle formed by the conjunction of base plate 2 and rim 3.

The slicing operation is now completed and the melon segments may be removed from melon holder 29.

It will be noted that, in operation, the downwardly vertical pressure exerted on the top portion of the melon by knife assembly 10, in conjunction with the horizontally stabilizing effect of the flat surface of the several blades on both faces of their respective cuts into the melon, imparts a stationary holding force to the melon preventing it from both rotating and tipping during the slicing operation.

It will also be noted that guide rods 6 and 7 guide knife blade assembly 10 during the downward stroke causing the several blades of the knife blade assembly to travel in respectively vertical planes, thereby further insuring straight cuts and uniform melon segments. It is also to be noted that stops 8 and 9 are positioned to allow knife assembly 10 to pass completely through the melon while preventing the cutting edges of the several blades from striking any portion of base 1.

It will be apparent that certain of the blades may be omitted from assembly 10 whereby the melon may be sliced into less than ten segments if desired. It is important, however, that at least one of the blades should have a cutting edge lower than at least one of the other blades to accomplish the slicing operation with greatest ease and with minimum crushing of the melon.

While only a certain preferred embodiment of this invention has been shown and described by way of illustration, many modifications will occur to those skilled in the art and it is, therefore, desired that it be understood that it is intended in the appended claim to cover all such modifications as fall within the true spirit and scope of this invention.

What is claimed as new and what it is desired to secure by Letters Patent of the United States is:

A melon slicing device comprising a generally circular base having an upstanding rim forming with said base a juice receptacle, diametric outwardly projecting lips rigidly attached to said base, respective guide rods mounted on said lips and projecting upwardly therefrom in spaced parallel relation, a respective stop carried by each said rod above its respective said lip, a circular frame having a circular central opening, a knife blade assembly disposed in said opening and comprising a thin, narrow knife blade extending diametrically across said opening and having opposite ends anchored to said frame, said blade having a straight lower cutting edge and a straight upper edge parallel thereto, said blade having a notch through its back edge at the center of said circular opening, and at least one thin, narrow cross blade entering said notch and welded at said notch to said first knife blade and having ends anchored to said frame, each end of each blade being equally spaced between the next blade ends and each blade comprising straight portions extending from said center outwardly to said frame, whereby said blade portions define a plurality of equal angles therebetween around said center, the cutting edge of said first knife blade being disposed at a level lower than the level of each other blade cutting edge of said assembly, whereby, upon lowering said blade assembly onto a melon to be sliced, said first blade enters said melon prior to the engagement of any said cross blade cutting edge with said melon, a pair of diametric outwardly projecting handles rigidly attached to said frame and respectively engaged slideably and guidedly on said rods, a slotted bowl of hollow generally hemispheroidal shape disposed between said rods and having an open upper end and an inner bottom surface, said bowl comprising a plurality of curved, triangularly shaped sections completely separated from each other by upwardly and outwardly extending slots, extending completely through the sides and bottom of the bowl, whereby said slots are arranged to allow said blades to pass completely through said bowl, and post means mounted on said base and supporting each of said sections, said sections being supported at a height to dispose said inner bottom surface of said bowl at a height above the highest upper blade edge of said assembly when said frame is lowered into position to engage said handles with said stops, said post means comprising an individual post for each said section disposed under the respective section, each post being attached to said base within said rim and extending upwardly and having an upper end affixed to and affording the sole support for its respective bowl section.

References Cited in the file of this patent

UNITED STATES PATENTS

| 1,040,582 | Royer et al. | Oct. 8, 1912 |
| 2,647,549 | Koch | Aug. 4, 1953 |

FOREIGN PATENTS

| 379,926 | Great Britain | Sept. 8, 1932 |
| 243,555 | Switzerland | Jan. 3, 1947 |